Sept. 29, 1931.        E. F. OHLENDORF        1,825,086
BUMPER MECHANISM
Filed July 12, 1930        3 Sheets-Sheet 3

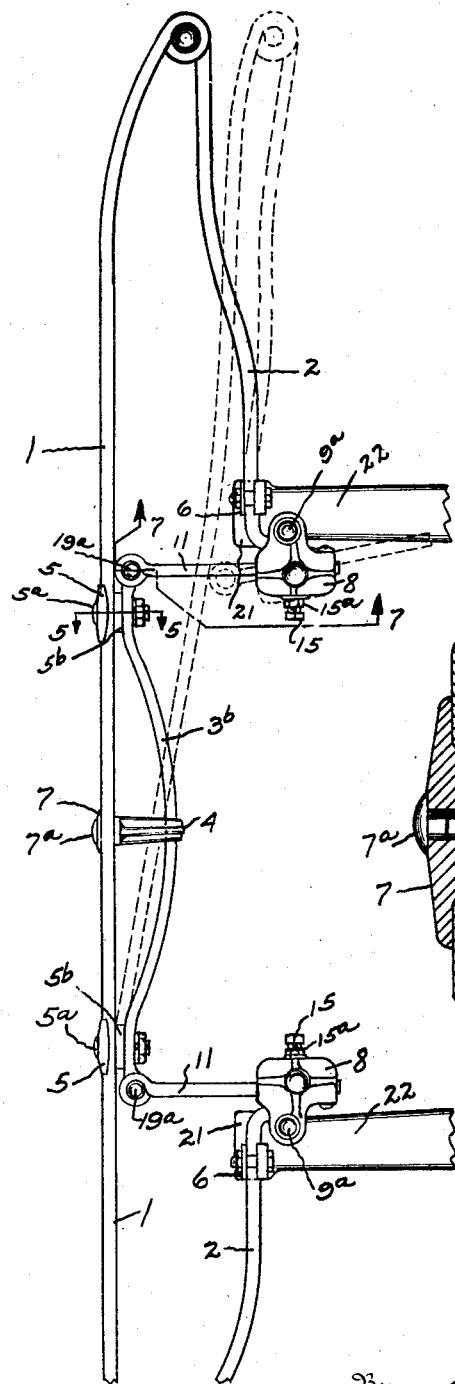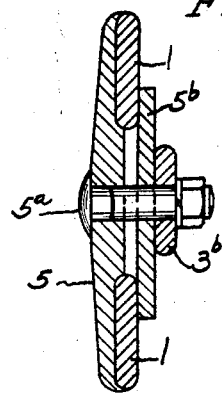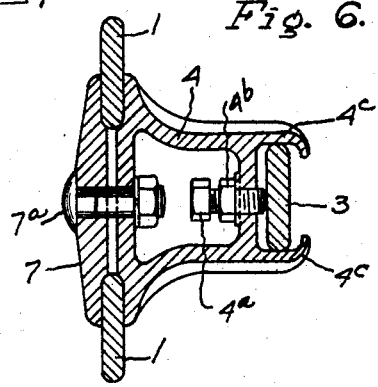

Inventor

E. F. OHLENDORF

By Lacey & Lacey, Attorneys

Patented Sept. 29, 1931

1,825,086

UNITED STATES PATENT OFFICE

EMIL F. OHLENDORF, OF MOLINE, ILLINOIS

BUMPER MECHANISM

Application filed July 12, 1930. Serial No. 467,562.

This invention relates to a bumper for vehicles and particularly to the type designed for mechanically propelled vehicles using a transversely disposed spring bar which yields under impact and automatically assumes normal position.

An important feature of the invention is the provision of connections between the bumper and vehicle whereby it is possible to make the bumper bars with a much higher elastic limit than is now possible, thus causing the bumper bars to automatically return the parts to a normal position.

Another feature is the mounting of a truss bar at the rear of the front bumper bars as a means of reinforcement.

For a full understanding of the invention and the merits thereof, reference is to be had to the accompanying drawings and the following description, in which corresponding and like parts are designated by similar reference characters.

In the accompanying drawings:

Figure 4 is a top plan view of a bumper showing a modification of the rear truss bar and resistance units, an end portion being broken away, and the dotted lines indicating the position of the parts when an end of the bumper yields under impact.

Figure 5 is an enlarged sectional view on the line 5—5 of Figure 4.

Figure 6 is an enlarged sectional view on the line 6—6 of Figure 1.

Figure 2:
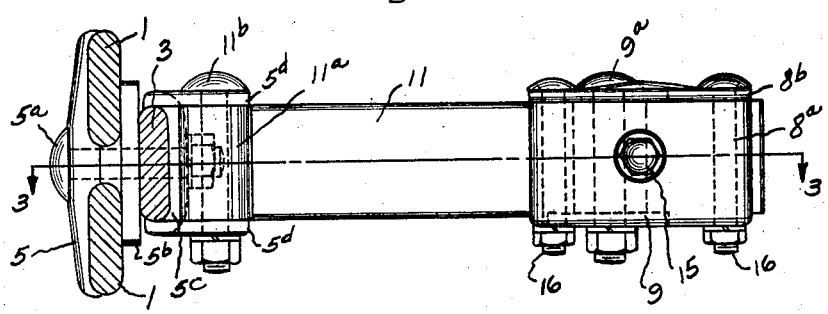
Figure 2 is an enlarged detail side view of a resistance connection between the front and rear bars comprising the bumper, partly in section, on the line 2—2 of Figure 1, looking in the direction of the arrows.

In the embodiment of the invention illustrated, the bumper includes members or bars 1 and 2, an intermediate brace, and clamps connecting the brace with the members 1. As shown most clearly in Figures 2, 5 and 6, the members 1 are held in position by clamps 4 and 5. The brace 3 consists of a single bar and its ends 3a are recurved and clamped to the inner ends of the members 2, at 6, the brace 3b of the modification being secured at and midway of its ends to the front member 1 by clamps 5 and 4. The middle clamp includes a body 4, plate 7, connecting bolt 7a, tension screw 4a, and lock nut 4b. The end clamps for the brace 3b comprise plates 5, 5b and bolt 5a. The end clamps for the brace 3 consist of plates 5, 5b, 5c, and bolt 5a. The bars 1 and 3 are clamped between the plates 5, 5b, and 5c and the bolt 5a passes between the bars 1 and through the bar 3 and plates. The plates 5b are disposed between the bars 1 and 3 and act as spacers.

A resistance is interposed between the members 1 and each of the members 2 and comprises a unit 8 and a strip or slide 11 in the form of a bar. The resistance unit 8 contemplates a housing 8a having a pair of laterally extending ears 9 through which a pivot bolt 9a is passed to connect the unit to the end of the member 2. Within the housing 8a are two strips 10 and 10a of composition rubber, fiber, or other suitable friction material. These strips 10 and 10a are disposed on opposite sides of the slide bar 11. The bar 11 is formed at its forward end with an eye 11a through which a pivot bolt 11b passes to connect it to ears 5d projecting rearwardly from the plate 5a. The friction strip 10a has a backing plate 12 which has one end crimped, as at 12a, to prevent the friction strip shifting in relation to the plate 12. Next to the backing plate 12 are placed two rollers 13. These rollers 13 are adapted to move freely on the plate 12 and in inclined recesses 14 formed in a follow plate 14a. An adjusting screw 15 is threaded in a side of the housing 8a and is locked by a nut 15a. The housing is closed by a suitable cover plate 8b which is held in position by bolts 16 and the bolt 9a.

Figure 8:
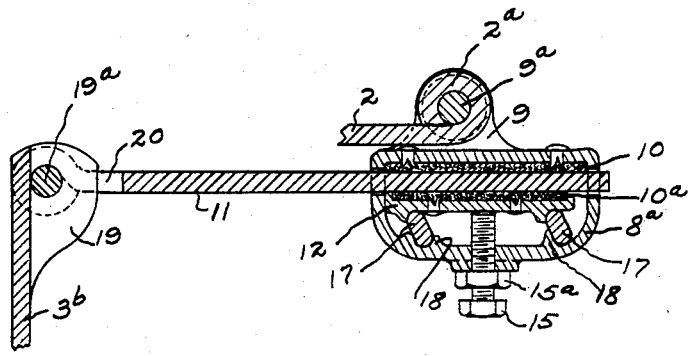
Figure 8 is a detail sectional view on the line 8—8 of Figure 7, looking in the direction indicated by the arrows.
Figure 9:
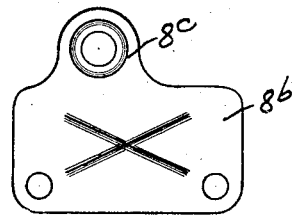
Figure 9 is a plan view of a cover plate.

In the modification, as shown most clearly in Figure 8, the rollers 13 and plate 14 are eliminated and replaced by two links 17. These links engage recesses 18 formed in a side of the housing 8a and shoulders formed on the plate 12. These links 17 are normally inclined and function in substantially the same manner as the rollers 13 and inclined recesses 14.

Side portions of the brace 3b at the ends thereof are brought together, as indicated at 19 in Figure 8, and are apertured to receive a bolt 19a which passes through an eye at the forward end of the bar 11. The part 19 is accommodated in a slot 20 formed in the bar 11. In this manner, a substantial pivotal connection is had between the bars 11 and the brace 3b.

Figure 1:
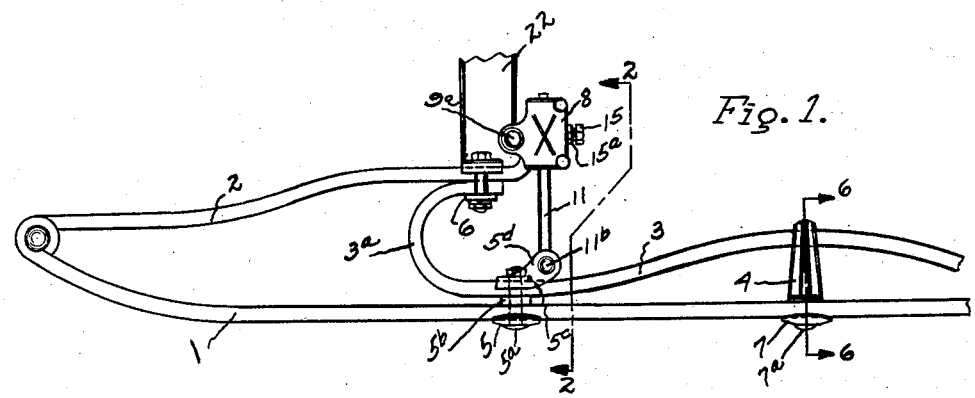
Figure 1 is a top plan view of a portion of a bumper illustrative of an embodiment of the invention, showing one side and the center truss bar clamp.

The parts normally occupy the position indicated by full lines in Figures 1 and 4, and when the bumper yields under impact, the parts assume the position indicated by dotted lines in Figure 4. The friction bar 11 slides in the resistance unit 8 and the resistance between the surfaces in contact reacts upon the bumper to retard its movement both in yielding under impact and in returning to normal position when relieved of the force of impact. It should be stated that the resistance units pivot on the bolts 9a to prevent binding and can be so adjusted that when forced back, the resistance will be slightly less than the energy stored up in the spring bars and the excess energy thus stored reacts to return the parts to normal position.

It is observed that the resistance unit, whether of the friction, hydraulic, or other type, is mounted between the front and rear bumper members and may be pivoted to the rear bumper member or to an eye provided on the frame of the chassis and formed with the horn 21 attached to the side frame bar 22.

Figure 3:
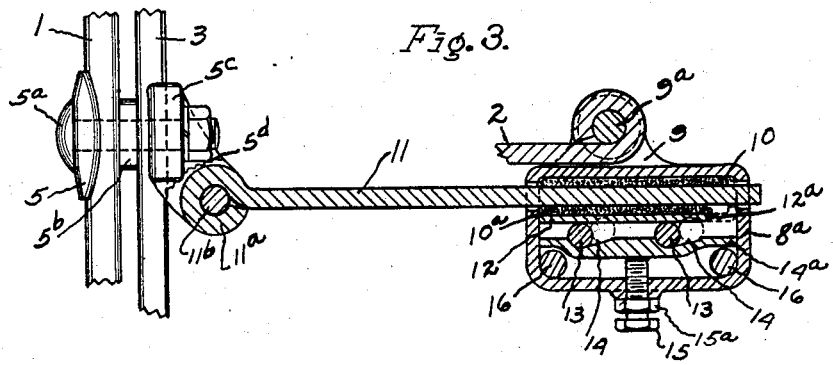
Figure 3 is a detail sectional view on the line 3—3 of Figure 2, looking in the direction indicated by the arrows.
Figure 7:
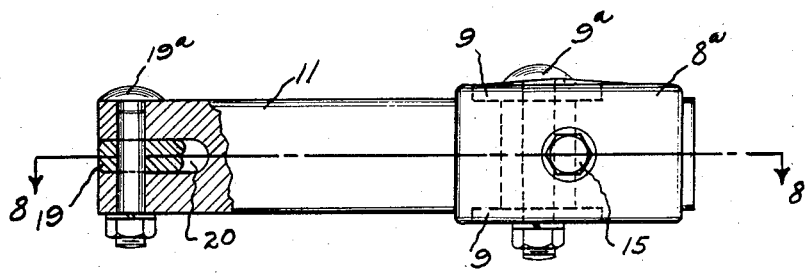
Figure 7 is an enlarged detail side view of the modification on the line 7—7 of Figure 4, looking in the direction of the arrows, partly in section.

As shown most clearly in Figure 3, the parts are all in normal position. When the bumper is forced back, the bar 11 moves back. Through the friction of the bar 11 and friction strip 10a, the plate 12 moves back as shown by dotted lines. This movement tends to shift the rollers 13 to the dotted line position and up the inclines of the recesses 14. This increases the pressure and resistance of the elements 10, 10a against the bar 11 as it moves back. On the rebound of the bumper the reverse takes place. As the bar 11 moves forward to return to normal position, there is a reduction of the friction between the bar 11 and friction strip 10a by reason of the rollers 13 moving down the inclines of the recesses 14. In consequence, the resistance on the rebound of the bumper is less than the resistance offered when the bumper is forced back by impact with an object. The modification as shown in Figure 8, utilizes links 17 which rock or tilt, thereby increasing the resistance to the rearward sliding movement of the bars 11 and diminishing the resistance to their forward movement, as will be readily appreciated. By adjusting the screw 15 the resistance may be varied to meet conditions. The lock nut 15a secures the screw in the required adjusted position.

The center clamp for the rear truss brace comprises plate 7, body 4, bolt 7a and screw 4a. The bars 1 comprising the front bumper member are clamped between the plate 7 and body 4. The brace 3, or 3b, is received between two lips 4c projecting from the body 4 and is secured by a clamp screw 4a threaded into the body 4, a lock nut 4b fixing the position of the screw 4a.

What is claimed is:

1. A bumper mechanism including a bumper bar and a resistance unit comprising a sliding friction member connected to the bumper bar and having side faces, and gripping members frictionally engaging the side faces of the sliding friction member to resist movement of the sliding member.

2. In a bumper mechanism, a front bumper bar, and a resistance unit pivotally mounted, and a sliding friction bar frictionally held against rearward movement by the resistance unit and having its front end connected with the front bumper bar.

3. In a bumper mechanism including a resistance unit comprising a housing, a friction bar slidable through the housing, friction strips mounted on opposite sides of the friction bar, and a backing plate mounted to bear against the friction strip on one side of the friction bar.

4. In a bumper mechanism, a resistance unit, including a housing, a sliding friction bar passing through the housing, friction strips mounted within the housing on opposite sides of the friction bar, a backing plate for the friction strip at one side of the friction bar, a plate in the housing adjustable towards and away from the backing plate and formed with tapered grooves and rollers rolling on the face of the backing plate and engaged in the tapered grooves formed in the adjustable plate.

5. In a bumper mechanism, a resistance unit, an adjustable plate having tapered grooves on its face, rollers rolling in said grooves, a threaded adjusting screw threaded into said housing, and a lock nut to lock said adjusting screw.

6. In a bumper mechanism, a resistance unit holding resistance mechanism, an extension lip forming lower supporting means for said unit, a cover plate for said unit having an extended lip to form upper supporting means, bolts to clamp said cover plate to the resistance unit, and a bolt passing through the lips to form a pivotal means between said resistance unit and a support for the same.

7. In a bumper mechanism, the combination of front and rear bumper bars, friction bars sliding within resistance units, said resistance units offering greater resistance to said bars when moved in one direction than when moved in the opposite direction.

8. In a bumper mechanism, a resistance unit housing, a sliding friction bar passing through the resistance housing, friction strips mounted within the housing and on opposite sides of the friction bar, a retaining plate for the friction strip on one side of said friction bar, lugs on said retaining plate, lugs on the inside face of a wall of the resistance unit housing, links pivotally mounted between the retaining plate and the housing wall, and an adjusting screw to adjust said retaining plate.

9. In a bumper mechanism, a front bumper bar, a resistance unit, a friction bar extending from said resistance unit to the front bumper bar, an eye formed on the front end of said friction bar, and a slot being formed through the front end of said friction bar, and an element projecting from the bumper bar and having a portion engaged with the slot and pivoted to the eye to pivotally mount the front end of the friction bar.

10. In a bumper mechanism, resistance units, friction bars extending from said resistance units, an eye and slot being formed in the front end of each friction bar, a front bumper bar, a rear truss bar, the ends of the truss bar being folded over to form suitable eyes in each end over the truss bar, and bolts passing through the eyes on the friction bars and the ends of the rear truss bar.

11. In a bumper mechanism, front bumper bars, a rear bar, a center clamp for said bumper bars, consisting of a front plate, a rear clamp plate having upper and lower lips supporting the rear truss bar and webs connecting the upper and lower lips, an adjusting screw threaded through one of the webs, a lock nut for said adjusting screw, and a front clamp bolt passing through the front clamp plate and the other web of the clamp plate.

12. In a bumper mechanism, front bumper bars, a rear truss bar, a center clamp holding said truss bar under tension, a clamp near each end of the rear truss bar which clamps the truss bar to the front bumper bars, said truss bar terminating in a curve of approximately semi-circular form, the rear end of said curve being clamped to the vehicle.

13. In a bumper mechanism, the combination of front and rear bumper bars, a rear truss bar, a resistance unit mounted on the rear bumper bar, and a resistance member, one end of which rests in the resistance unit, and the other end of said resistance member being mounted on the front bumper bars.

14. In a bumper mechanism, the combination of front and rear bumper bars, a resistance member having an eye formed at its front end, a clamp plate clamped to the front bumper bar by a bolt, an upper and a lower lip projecting from said clamp, the eye of the resistance member resting between said upper and lower lips of the clamp, and a bolt passing through the lips of the clamp and eye of the resistance member thereby making a pivotal connection between the resistance member and front bumper bars.

In testimony whereof I affix my signature.
EMIL F. OHLENDORF. [L. S.]